United States Patent
Ito (10) Patent No.: US 9,745,877 B2
(45) Date of Patent: Aug. 29, 2017

(54) EXHAUST GAS PURIFICATION APPARATUS FOR AN INTERNAL COMBUSTION ENGINE

(75) Inventor: Katsuhiro Ito, Mishima (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 14/404,400

(22) PCT Filed: Jun. 1, 2012

(86) PCT No.: PCT/JP2012/064299
§ 371 (c)(1),
(2), (4) Date: Nov. 26, 2014

(87) PCT Pub. No.: WO2013/179487
PCT Pub. Date: Dec. 5, 2013

(65) Prior Publication Data
US 2015/0107230 A1    Apr. 23, 2015

(51) Int. Cl.
*F02M 25/06*    (2016.01)
*F01N 3/20*    (2006.01)
(Continued)

(52) U.S. Cl.
CPC ......... *F01N 3/2006* (2013.01); *F01N 3/2066* (2013.01); *F01N 13/009* (2014.06);
(Continued)

(58) Field of Classification Search
CPC ... F02D 41/0055; F02D 41/401; F02D 225/38
See application file for complete search history.

(56) References Cited

U.S. PATENT DOCUMENTS

2003/0070423 A1    4/2003  Morinaga et al.
2003/0116123 A1*   6/2003  Ito ........................... F02M 26/28
                                                                123/299
(Continued)

FOREIGN PATENT DOCUMENTS

EP    1 138 900 A2    10/2001
EP    1 905 992 A1    4/2008
(Continued)

OTHER PUBLICATIONS

Machine English translation of JP 2007-239624 A.*

*Primary Examiner* — Mark Laurenzi
*Assistant Examiner* — Jason Sheppard
(74) *Attorney, Agent, or Firm* — Finnegan, Henderson, Farabow, Garrett & Dunner, LLP (57) ABSTRACT

In an exhaust gas purification apparatus for an internal combustion engine which is provided with an NOx catalyst arranged in an exhaust passage of the internal combustion engine, the present invention has for its problem to be solved to suppress an increase in exhaust emissions, which results from processing for raising the temperature of the NOx catalyst, to a small level. In order to solve the above-mentioned problem, the exhaust gas purification apparatus for an internal combustion engine of the invention is constructed such that when an amount of increase in the $NO_X$ removal rate becomes smaller with respect to an amount of rise in the temperature of the NOx catalyst, the execution of temperature raising processing is deferred, and processing to make small the flow rate of exhaust gas discharged from the internal combustion engine and processing to make small the amount of smoke discharged from the internal combustion engine are executed.

4 Claims, 8 Drawing Sheets

(51) Int. Cl.
  *F02D 41/02* (2006.01)
  *F02D 41/40* (2006.01)
  *F02D 41/00* (2006.01)
  *F01N 13/00* (2010.01)
  *F02M 26/00* (2016.01)
  *F01N 3/10* (2006.01)
  *F01N 3/035* (2006.01)

(52) U.S. Cl.
  CPC ....... *F02D 41/0055* (2013.01); *F02D 41/024* (2013.01); *F02D 41/025* (2013.01); *F02D 41/401* (2013.01); *F02M 26/00* (2016.02); *F01N 3/035* (2013.01); *F01N 3/106* (2013.01); *F01N 2610/02* (2013.01); *F01N 2610/105* (2013.01); *F02D 2200/0802* (2013.01); *Y02T 10/24* (2013.01); *Y02T 10/26* (2013.01); *Y02T 10/44* (2013.01); *Y02T 10/47* (2013.01)

(56) References Cited

U.S. PATENT DOCUMENTS

| | | | |
|---|---|---|---|
| 2009/0235644 A1* | 9/2009 | Wu | B01D 53/9495 60/285 |
| 2010/0229536 A1* | 9/2010 | Nakatani | F01N 3/0842 60/278 |

FOREIGN PATENT DOCUMENTS

| | | |
|---|---|---|
| JP | 2007-239624 | 9/2007 |
| JP | 2008-144596 A | 6/2008 |
| JP | 2010-185321 | 8/2010 |
| JP | 2011-163312 A | 8/2011 |
| JP | 2003-138960 | 5/2014 |
| WO | WO 2011/118030 A1 | 9/2011 |

\* cited by examiner

EXHAUST GAS PURIFICATION APPARATUS FOR AN INTERNAL COMBUSTION ENGINE

CROSS-REFERENCE TO RELATED APPLICATIONS

This application is a national phase application of International Application No. PCT/JP2012/064299, filed Jun. 1, 2012, the content of which is incorporated herein by reference.

TECHNICAL FIELD

The present invention relates to an exhaust gas purification apparatus for an internal combustion engine, and in particular, to a technology in which the temperature of an NOx catalyst arranged in an exhaust passage of the internal combustion engine is caused to rise.

BACKGROUND ART

In an exhaust gas purification apparatus in which a catalyst for exhaust gas purification is arranged in an exhaust passage of an internal combustion engine, there has been known a technology in which temperature raising processing to raise the temperature of the catalyst to an activation temperature thereof is started at the time of the start of the internal combustion engine. In addition, there has also been proposed a technology in which in cases where the state of a catalyst after the lapse of a predetermined period of time from the start of an internal combustion engine has not yet reached a desired warm-up state, a control parameter in temperature raising processing is changed so that the temperature of the catalyst goes up much more easily (for example, refer to a first patent literature).

Moreover, a second patent literature describes a technology that in a system in which for a predetermined period of time from the start of an internal combustion engine, exhaust gas reduction control is executed for reducing or decreasing an amount of hydrocarbon (HC) discharged from the internal combustion engine, and after the lapse of the predetermined period of time, catalyst warming-up promotion control is executed for causing the temperature of an exhaust gas purification catalyst to go up, the length of the predetermined period of time is changed according to the degree of deterioration of the catalyst.

CITATION LIST

Patent Literatures

[First Patent Literature] Japanese patent laid-open publication No. 2003-138960
[Second Patent Literature] Japanese patent laid-open publication No. 2010-185321

SUMMARY OF THE INVENTION

Problems to be Solved by the Invention

However, in cases where an NOx catalyst such as a selective reduction catalyst is used as an exhaust gas purification catalyst, if temperature raising processing is started by using as a trigger the start of an internal combustion engine, exhaust emissions may be increased on the contrary.

For example, when the temperature of the NOx catalyst is less than a predetermined temperature which is lower than an activation temperature thereof, even if the temperature of the NOx catalyst goes up, the $NO_x$ removal rate (which is the ratio of the amount of $NO_x$ removed by the $NO_x$ catalyst to the amount of $NO_x$ flowing into the $NO_x$ catalyst) does not substantially go up. For that reason, when the temperature raising processing is started by using as a trigger the start of the internal combustion engine at the time the temperature of the NOx catalyst is lower than the predetermined temperature, emissions such as smoke, carbon dioxide ($CO_2$), etc., may increase, without substantially causing the NOx removal rate to go up.

The present invention has been made in view of the above-mentioned actual circumstances, and the object of the present invention is to provide a technology which, in an exhaust gas purification apparatus for an internal combustion engine with an NOx catalyst being arranged in an exhaust passage of the internal combustion engine, can cause the temperature of the NOx catalyst to go up, while suppressing an increase in exhaust emissions.

Means for Solving the Problems

In order to solve the above-mentioned problems, the present invention focuses attention on the correlation between the temperature of an NOx catalyst and the $NO_x$ removal rate thereof, and adjusts an engine operating state in such a manner that when an amount of increase in the $NO_x$ removal rate becomes smaller with respect to an amount of rise in the temperature of the NOx catalyst, the execution of temperature raising processing is deferred and at the same time an amount of emissions discharged from the internal combustion engine becomes small.

Specifically, an exhaust gas purification apparatus for an internal combustion engine according to the present invention is provided with:

an NOx catalyst that is arranged in an exhaust passage of the internal combustion engine;

a detection unit that detects the temperature of said NOx catalyst;

a smoke reduction unit that executes smoke reduction processing which is processing to cause the internal combustion engine to operate in such a manner that an amount of smoke discharged from the internal combustion engine becomes small;

an air amount reduction unit that executes air amount reduction processing which is processing to cause the internal combustion engine to operate in such a manner that an amount of intake air to be sucked into the internal combustion engine becomes small;

a temperature raising unit that executes temperature raising processing which is processing to raise the temperature of said NOx catalyst; and a control unit that performs such control that said smoke reduction processing and said air amount reduction processing are executed, without executing said temperature raising processing, when the temperature detected by said detection unit is less than a lower limit value which is lower than an activation temperature of said NOx catalyst, and said temperature raising processing is executed when the temperature detected by said detection unit is equal to or more than said lower limit value and at the same time is less than said activation temperature.

When the temperature of the NOx catalyst is less than the lower limit temperature, even if the temperature of the NOx catalyst goes up, the $NO_x$ removal rate (which is the ratio of the amount of $NO_x$ removed by the $NO_x$ catalyst to the amount of $NO_x$ flowing into the $NO_x$ catalyst) does not substantially go up. On the other hand, when the temperature of the NOx catalyst is equal to or more than the lower limit value and at the same time is less than the activation temperature, the higher the temperature of the NOx catalyst goes up, the higher the $NO_X$ removal rate also goes up. Here, note that the "lower limit temperature" referred to herein is, for example, a temperature (partial activation temperature) at which a part of the NOx catalyst arranged in the exhaust passage becomes activated. In addition, the "activation temperature" referred to herein is, for example, a temperature (complete activation temperature) at which the whole of the NOx catalyst arranged in the exhaust passage becomes activated.

When the temperature raising processing is executed at the time the temperature of the NOx catalyst is lower than said lower limit temperature, the temperature of the NOx catalyst will go up, but the $NO_x$ removal rate does not substantially go up. For that reason, there is a problem that in a period of time from the start of the temperature raising processing until the temperature of the NOx catalyst becomes equal to or higher than said lower limit temperature (hereinafter, referred to as a "first period of time"), an amount of NOx discharged into the atmosphere does not substantially decrease, and besides, an amount of fuel consumption and an amount of generation of carbon dioxide ($CO_2$) increase to an unnecessary extent.

On the other hand, when the temperature raising processing is no longer executed in said first period of time, an increase in the amount of fuel consumption (the amount of generation of $CO_2$) accompanying the execution of the temperature raising processing is suppressed. Here, note that in the case where the temperature raising processing is not executed in said first period of time, an amount of NOx passing through the NOx catalyst (in other words, an amount of NOx which is not reduced by the NOx catalyst) may become larger, in comparison with the case where the temperature raising processing is executed. However, when the air amount reduction processing is executed in said first period of time, an absolute amount of NOx discharged from the internal combustion engine decreases in accordance with the decreasing amount of gas discharged from the internal combustion engine. Moreover, in the case where the amount of gas discharged from the internal combustion engine is small, a space velocity of NOx in the NOx catalyst (specifically, a space velocity of NOx in a catalyst casing which receives the NOx catalyst) becomes smaller, in comparison with the case where the amount of gas discharged from the internal combustion engine is large. In the case where the space velocity of NOx in the NOx catalyst is small, the $NO_X$ removal rate becomes higher, in comparison with the case where the space velocity of NOx in the NOx catalyst is large. Accordingly, when in said first period of time, the temperature raising processing is not executed and the air amount reduction processing is executed, it is possible to decrease the amount of fuel consumption (the amount of generation of $CO_2$), while suppressing the increase in the amount of NOx passing through the NOx catalyst.

In addition, in cases where the air amount reduction processing is executed in said first period of time, the amount of generation of smoke including hydrocarbon (HC), etc., may increase, in comparison with the case where the air amount reduction processing is not executed. On the other hand, when the smoke reduction processing is executed together with the air amount reduction processing in said first period of time, the increase of the smoke accompanying the execution of the air amount reduction processing can be suppressed.

Here, note that in cases where the temperature raising processing is not executed in said first period of time, the temperature raising processing will be started at the time when the temperature of the NOx catalyst reaches said lower limit value. For that reason, the amount of NOx passing through the NOx catalyst, the amount of generation of smoke, and the amount of fuel consumption (the amount of generation of $CO_2$) in a period of time in which the temperature of the NOx catalyst goes up from said lower limit value to said activation temperature (hereinafter, referred to as a "second period of time") may become larger when the temperature of the NOx catalyst is less than the lower limit value, than in the case where the temperature raising processing is started.

In contrast to this, in the case where in said first period of time, the temperature raising processing is not executed and at the same time the smoke reduction processing and the air amount reduction processing are executed, the amount of NOx passing through the NOx catalyst, the amount of generation of smoke, and the amount of fuel consumption (the amount of generation of $CO_2$) in said first period of time become smaller, in comparison with the case where in said first period of time, the temperature raising processing is executed and at the same time the smoke reduction processing and the air amount reduction processing are not executed.

Accordingly, an amount of increase in the amount of NOx passing through the NOx catalyst, an amount of increase in the amount of generation of smoke, and an amount of increase in the amount of fuel consumption (the amount of generation of $CO_2$) in said second period of time are offset by an amount of decrease in the amount of NOx passing through the NOx catalyst, an amount of decrease in the amount of generation of smoke, and an amount of decrease in the amount of fuel consumption (the amount of generation of $CO_2$) in said first period of time, respectively. In particular, in the case where in said first period of time, the temperature raising processing is not executed and at the same time the smoke reduction processing and the air amount reduction processing are executed, the amount of generation of smoke and the amount of fuel consumption (the amount of generation of $CO_2$) become smaller to a great extent, in comparison with the case where in said first period of time, the temperature raising processing is executed and at the same time the smoke reduction processing and the air amount reduction processing are not executed.

As a result, in the case where in said first period of time, the temperature raising processing is not executed and at the same time the air amount reduction processing and the smoke reduction processing are executed, it is possible to decrease the amount of generation of smoke and the amount of fuel consumption (the amount of generation of $CO_2$), while suppressing the amount of NOx passing through the NOx catalyst throughout the first period of time and the second period of time to be equal or less, in comparison with the case where in said first period of time, the temperature raising processing is executed and at the same time the air amount reduction processing and the smoke reduction processing are not executed.

As the smoke reduction processing of the present invention, processing to advance fuel injection timing, which is the time when fuel is injected into a cylinder of the internal combustion engine, may be executed. In cases where the fuel injection timing is advanced, the amount of generation of smoke becomes smaller, in comparison with the case where the fuel injection timing is advanced. As a result, the amount of smoke to be generated in the first period of time can be suppressed to be small.

Moreover, in cases where an EGR device for introducing a part of exhaust gas into cylinders of the internal combustion engine as an EGR gas is mounted on the internal combustion engine, processing of decreasing an amount of EGR gas to be introduced into each cylinder by said EGR device may be executed as the smoke reduction processing. In the case where the amount of EGR gas introduced into each cylinder is small, the amount of oxygen introduced into each cylinder becomes larger, and the combustion temperature of fuel therein becomes higher, in comparison with the case where the amount of EGR gas introduced into each cylinder is large. As a result, in cases where the amount of EGR gas introduced into each cylinder by means of said EGR device is decreased, the amount of generation of smoke becomes smaller, in comparison with the case where the amount of EGR gas introduced into each cylinder is not decreased. Accordingly, the amount of smoke to be generated in the first period of time can be suppressed to be small.

However, in cases where an advance in the fuel injection timing or a decrease in the amount of EGR gas is executed, the amount of generation of NOx may become larger, in comparison with the case where an advance in the fuel injection timing or a decrease in the amount of EGR gas is not executed. However, an amount of increase in the amount of generation of NOx can be offset by the execution of the air amount reduction processing.

Here, note that as the temperature raising processing of the present invention, processing of supplying unburnt fuel to an oxidation catalyst which is arranged in the exhaust passage at a location upstream of the NOx catalyst may be executed. As a method of supplying unburnt fuel, use may be made of a method of injecting fuel into a cylinder in expansion stroke or exhaust stroke (after injection), or a method of adding fuel from a fuel addition valve which is arranged at the upstream side of the oxidation catalyst. Also, note that in the case of supplying unburnt fuel to the oxidation catalyst, it is necessary that the oxidation catalyst has been activated, and hence, it is desirable to execute the temperature raising processing on condition that the temperature of the NOx catalyst is equal to or higher than the lower limit value, and the temperature of the oxidation catalyst is equal to or higher than an activation temperature thereof. The activation temperature of the oxidation catalyst referred to herein should just be a temperature at which at least a part of the oxidation catalyst arranged in the exhaust passage becomes activated.

Further, as the NOx catalyst of the present invention, there can be used an occlusion (or storage) reduction catalyst or a selective reduction catalyst, but it is preferable to use the selective reduction catalyst. For example, the selective reduction catalyst has a tendency that the smaller the flow rate of exhaust gas passing through the selective reduction catalyst, the lower the partial activation temperature (the lower limit value) thereof becomes. Accordingly, in the case where the selective reduction catalyst is used as the NOx catalyst, the lower limit value thereof becomes lower by the execution of said air amount reduction processing. As a result, it becomes possible to start the temperature raising processing earlier than in the case where said air amount reduction processing is not executed, so that the time of activation of the selective reduction catalyst can be brought forward.

Advantageous Effects of the Invention

According to the present invention, in an exhaust gas purification apparatus for an internal combustion engine with an NOx catalyst being arranged in an exhaust passage of the internal combustion engine, it is possible to cause the temperature of the NOx catalyst to go up, while suppressing an increase in exhaust emissions.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in these embodiments are not intended to limit the technical scope of the present invention to these alone in particular as long as there are no specific statements.

Figure 1:
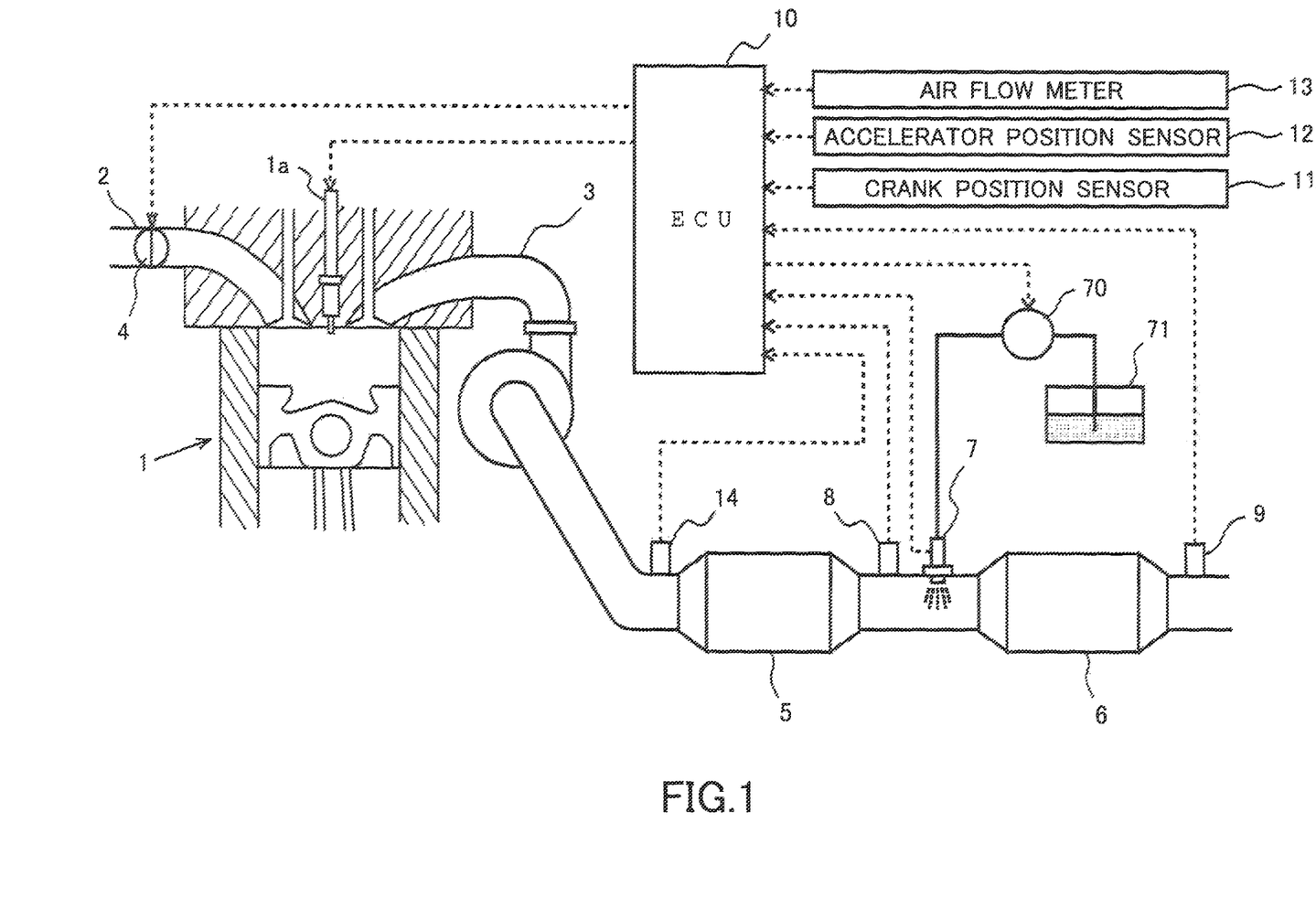
FIG. 1 is a view showing the schematic construction of an internal combustion engine with its intake and exhaust systems to which the present invention is applied.

FIG. 1 is a view showing the schematic construction of an internal combustion engine to which the present invention is applied. The internal combustion engine 1 shown in FIG. 1 is a compression ignition type internal combustion engine (diesel engine) having a plurality of cylinders. Here, note that the internal combustion engine to which the present invention is applied is not limited to internal combustion engines of compression ignition type, but may be internal combustion engines of spark ignition type (gasoline engines) in which a lean burn operation is executed.

The internal combustion engine 1 is provided with fuel injection valves 1a for injecting fuel into corresponding cylinders, respectively. In addition, an intake passage 2 and an exhaust passage 3 are connected to the internal combustion engine 1. The intake passage 2 is a passage for guiding fresh air (hereinafter simply air) taken in from the atmosphere to each cylinder of the internal combustion engine 1. The exhaust passage 3 is a passage for circulating or passing a burned gas (an exhaust gas) discharged from the interior of each cylinder of the internal combustion engine 1.

A throttle valve 4 is arranged in the middle of the intake passage 2. The throttle valve 4 is a valve mechanism which serves to adjust an amount of air to be sucked into each cylinder of the internal combustion engine 1 by changing the channel cross section of the intake passage 2. Here, note that the throttle valve 4 is provided with a valve body and an electric motor for driving to open and close the valve body, wherein the electric motor is controlled by an ECU 10 which will be described later.

A first catalyst casing 5 and a second catalyst casing 6 are arranged in series with each other in the middle of the exhaust passage 3 in this order from an upstream side thereof. The first catalyst casing 5 has therein an oxidation catalyst and a particulate filter which are received in a cylindrical casing. At that time, the oxidation catalyst may be supported by a catalyst carrier which is arranged at the upstream side of the particulate filter, or may be supported by the particulate filter.

In addition, the second catalyst casing 6 receives therein a catalyst carrier by which a selective reduction catalyst is supported in a cylindrical casing. The catalyst carrier is formed by coating an alumina-based or zeolite-based active component (carrier) on a substrate of monolithic type having a honeycomb-shaped cross section which is made, for example, of cordierite, Fe—Cr—Al heat resisting steel, etc. Moreover, a noble metal catalyst (e.g., platinum (Pt), palladium (Pd)) having oxidation ability is supported by the catalyst carrier. The selective reduction catalyst constructed in this manner is an example of the NOx catalyst according to the present invention. The second catalyst casing 6 may receive an occlusion (storage) reduction catalyst instead of the selective reduction catalyst.

Here, note that in the interior of the second catalyst casing 6, there may be arranged a catalyst carrier which supports an oxidation catalyst at the downstream side of the selective reduction catalyst. The oxidation catalyst in that case is able to oxidize, among a reducing agent supplied to the selective reduction catalyst from a reducing agent addition valve 7 to be described later, a part of the reducing agent having passed sideways through the selective reduction catalyst.

The reducing agent addition valve 7 for adding (injecting) the reducing agent, which is $NH_3$ or a precursor of $NH_3$, into the exhaust gas is mounted on the exhaust passage 3 at a location between the first catalyst casing 5 and the second catalyst casing 6. The reducing agent addition valve 7 is a valve mechanism having a nozzle hole which is opened and closed by the movement of a needle. The reducing agent addition valve 7 is connected to a reducing agent tank 71 through a pump 70. The pump 70 draws the reducing agent stored in the reducing agent tank 71, and at the same time, pressure feeds the reducing agent thus drawn to the reducing agent addition valve 7. The reducing agent addition valve 7 injects the reducing agent pressure fed from the pump 70 into the exhaust passage 3. Here, note that the opening and closing timing of the reducing agent addition valve 7 and the pressure of delivery of the pump 70 are electrically controlled by means of the ECU 10.

Here, as the reducing agent stored in the reducing agent tank 71, there can be used a water solution such as urea, ammonium carbamate, etc., or $NH_3$ gas. In this embodiment, reference will be made to an example in which an aqueous urea solution is used as the reducing agent.

When the aqueous urea solution is injected from the reducing agent addition valve 7, the aqueous urea solution flows into the second catalyst casing 6 together with the exhaust gas. At that time, the aqueous urea solution is pyrolyzed or hydrolyzed by receiving the heat of the exhaust gas or the second catalyst casing 6. When the aqueous urea solution is pyrolyzed or hydrolyzed, ammonia ($NH_3$) is generated. The ammonia ($NH_3$) generated in this manner is adsorbed or occluded to the selective reduction catalyst. The ammonia ($NH_3$) adsorbed or occluded to the selective reduction catalyst reacts with the nitrogen oxides (NOx) contained in the exhaust gas to generate nitrogen ($N_2$) and water ($H_2O$). That is, the ammonia ($NH_3$) functions as a reducing agent for the nitrogen oxides (NOx).

The ECU 10 is provided in combination with the internal combustion engine 1 as constructed in this manner. The ECU 10 is an electronic control unit which is provided with a CPU, a ROM, a RAM, a backup RAM, and so on. The ECU 10 is electrically connected to a variety of kinds of sensors such as a first exhaust gas temperature sensor 8, a second exhaust gas temperature sensor 9, a crank position sensor 11, an accelerator position sensor 12, an air flow meter 13, an air fuel ratio (A/F) sensor 14, and so on.

The first exhaust gas temperature sensor 8 is arranged in the exhaust passage 3 at a location downstream of the first catalyst casing 5 and upstream of the second catalyst casing 6, and outputs an electric signal correlated with the temperature of the exhaust gas which flows out from the first catalyst casing 5. The second exhaust gas temperature sensor 9 is arranged in the exhaust passage 3 at a location downstream of the second catalyst casing 6, and outputs an electric signal correlated with the temperature of the exhaust gas which flows out from the second catalyst casing 6. The crank position sensor 11 outputs an electric signal correlated with the rotational position of an output shaft (crankshaft) of the internal combustion engine 1. The accelerator position sensor 12 outputs an electric signal correlated with the amount of operation of an accelerator pedal (i.e., the degree of opening of an accelerator). The air flow meter 13 outputs an electric signal correlated with the amount of air (i.e., the amount of intake air) sucked into the internal combustion engine 1. The A/F sensor 14 is arranged in the exhaust passage 3 at a location upstream of the first catalyst casing 5, and outputs an electric signal correlated with the air fuel ratio of the exhaust gas.

The ECU 10 is electrically connected to the various kinds of equipment such as the fuel injection valves 1a, the throttle valve 4, the reducing agent addition valve 7, the pump 70, and so on. The ECU 10 controls the above-mentioned variety of kinds of equipment in an electrical manner based on the output signals of the above-mentioned variety of kinds of sensors. For example, in addition to known control operations such as the fuel injection control of the internal combustion engine 1, the addition control to cause the reducing agent to be injected intermittently from the reducing agent addition valve 7, etc., the ECU 10 executes the temperature raising control of the selective reduction catalyst which is received in the second catalyst casing 6. In the following, reference will be made to how to execute the temperature raising control in this embodiment.

When the internal combustion engine 1 is cold started, the oxidation catalyst and the selective reduction catalyst will be in a state where they have not been activated, i.e., the oxidation catalyst can not oxidize unburnt fuel components (HC, CO, etc.) in the exhaust gas, and the selective reduction catalyst can not reduce the nitrogen oxides (NOx) in the exhaust gas. Accordingly, it is necessary to activate the oxidation catalyst and the selective reduction catalyst at an early period of time.

As a method for activating the oxidation catalyst and the selective reduction catalyst at an early period of time, there has been known one which executes processing (temperature raising processing) to supply unburnt fuel components to the oxidation catalyst by adding fuel into the exhaust passage 3 at a location upstream of the oxidation catalyst, or executing after injection from the fuel injection valves into corresponding cylinders which are in an expansion stroke or an exhaust stroke. According to such a method, the temperature of the oxidation catalyst or the selective reduction catalyst can be caused to go up by using the heat generated at the time when the unburnt fuel components are oxidized in the oxidation catalyst.

Figure 2:
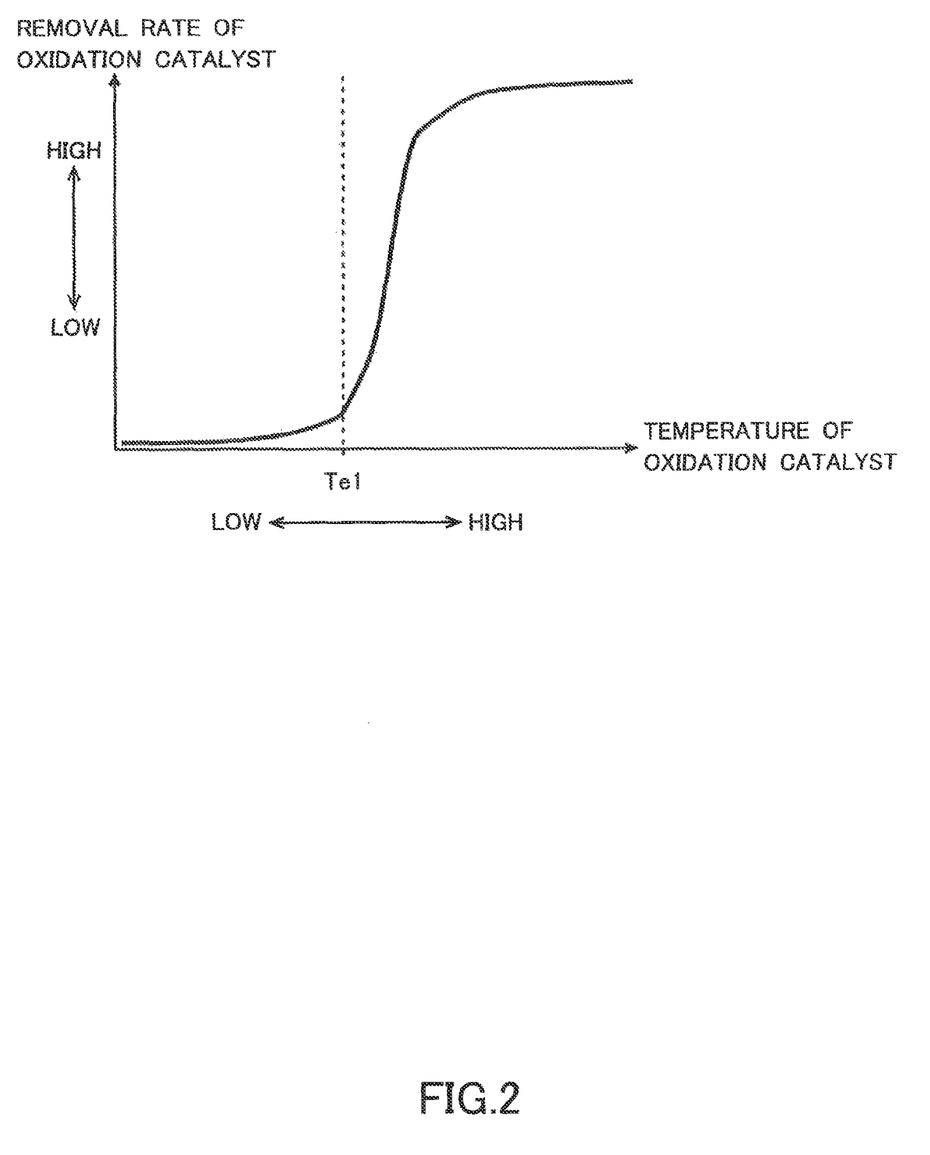
FIG. 2 is a view showing the relation between the temperature of an oxidation catalyst and the removal rate thereof.

However, when the oxidation catalyst or the selective reduction catalyst is lower than a predetermined temperature, an amount of increase in the removal rate with respect to an amount of rise in the temperature of each catalyst becomes small. Here, the relation between the temperature (bed temperature) and the removal rate (oxidation rate of unburnt fuel) of the oxidation catalyst is shown in FIG. 2. As shown in FIG. 2, when the temperature of the oxidation catalyst is lower than a predetermined temperature (first temperature) Te1, even if the temperature of the oxidation catalyst goes up, the removal rate thereof does not substantially increase. The "first temperature Te1" referred to herein is a temperature (a partial activation temperature) at which at least a part of the oxidation catalyst received in the first catalyst casing 5 is activated. When the temperature raising processing is executed at the time the temperature of the oxidation catalyst is lower than the first temperature Te1, the greater part of the unburnt fuel components supplied to the oxidation catalyst may be discharged into the atmosphere, without being oxidized.

Figure 3:
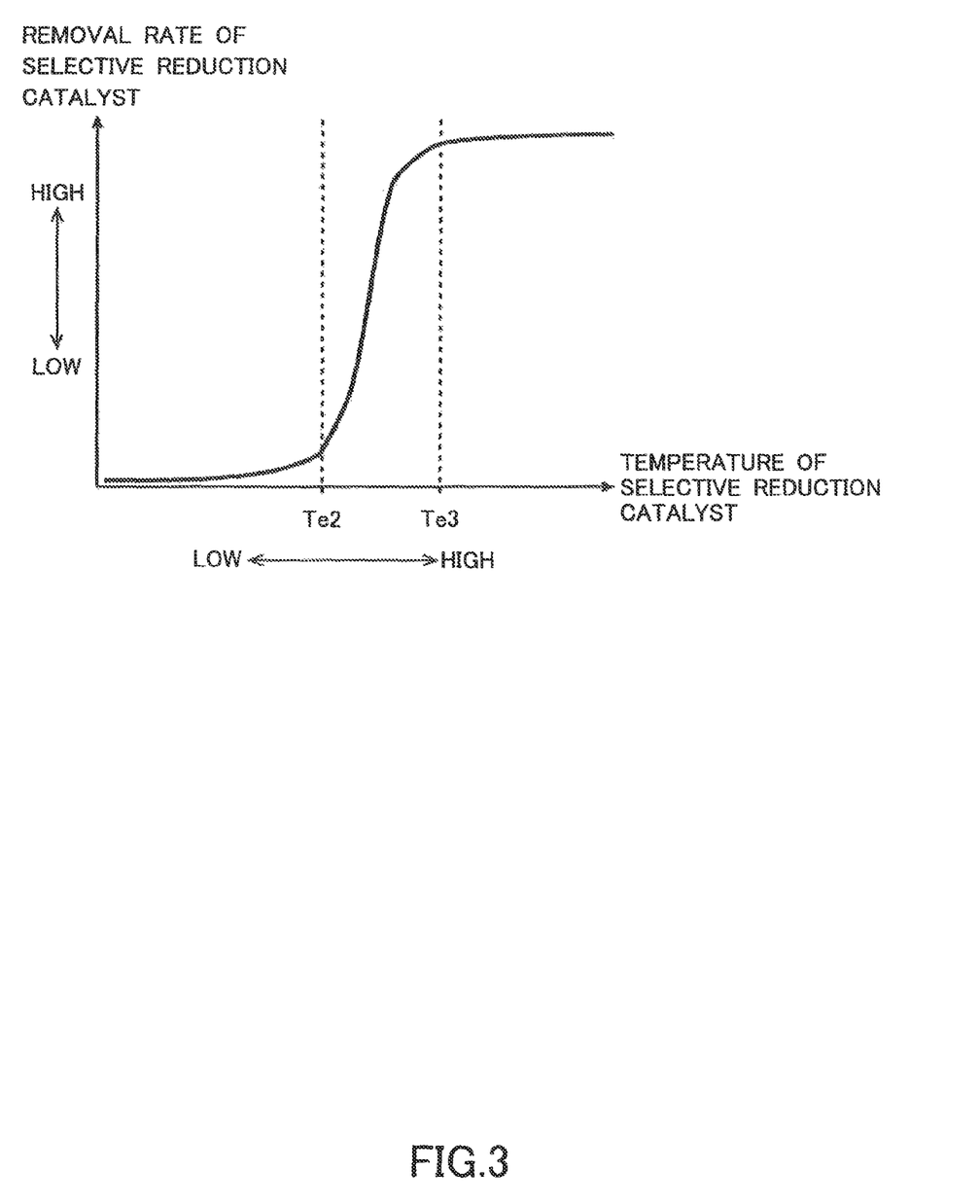
FIG. 3 is a view showing the relation between the temperature of a selective reduction catalyst and the removal rate thereof.

FIG. 3 is a view showing the relation between the temperature of the selective reduction catalyst and the removal (NOx reduction) rate thereof. As shown in FIG. 3, when the temperature of the selective reduction catalyst is lower than a predetermined temperature (second temperature) Te2, the amount of increase in the $NO_x$ removal rate of the selective reduction catalyst becomes smaller with respect to the amount of rise in the temperature thereof. On the other hand, when the temperature of the selective reduction catalyst belongs to a range in which it is equal to or higher than the second temperature Te2 and at the same time is less than a third temperature Te3, the amount of increase in the $NO_x$ removal rate of the selective reduction catalyst becomes larger with respect to the amount of rise in the temperature thereof.

The "second temperature Te2" referred to herein is the lowest temperature at which a temperature change ratio (i.e., a ratio of the amount of increase in the $NO_x$ removal rate with respect to the amount of rise in the temperature of the selective reduction catalyst) at the time when the temperature of the selective reduction catalyst goes up a predetermined amount (value) becomes equal to or larger than a reference value, and is, for example, a temperature (partial activation temperature) at which at least a part of the selective reduction catalyst received in the second catalyst casing 6 is activated. Here, note that the second temperature Te2 is an example of a "lower limit value" according to the present invention. In addition, the "third temperature Te3" referred to herein is, for example, a temperature (complete activation temperature) at which the whole of the selective reduction catalyst received in the second catalyst casing 6 is activated.

When the temperature raising processing is executed at the time the temperature of the selective reduction catalyst is lower than the second temperature Te2, the temperature of the selective reduction catalyst will go up, but the $NO_X$ removal rate thereof does not substantially increase. As a result, the amount of fuel consumption increases unnecessarily, so an amount of carbon dioxide ($CO_2$) generated in the oxidation catalyst may also increase unnecessarily. On the other hand, when the temperature raising processing is executed at the time the temperature of the selective reduction catalyst is equal to or more than the second temperature Te2 and at the same time is less than the third temperature Te3, the temperature of the selective reduction catalyst can be caused to go up, and at the same time, the $NO_X$ removal rate thereof can also be caused to increase to a sufficient extent.

Accordingly, it is desirable to execute the temperature raising processing, on condition that the temperature of the oxidation catalyst is equal to or more than the first temperature Te1, and at the same time the temperature of the selective reduction catalyst is equal to or higher than the second temperature Te2 and is less than the third temperature Te3.

Figure 4:
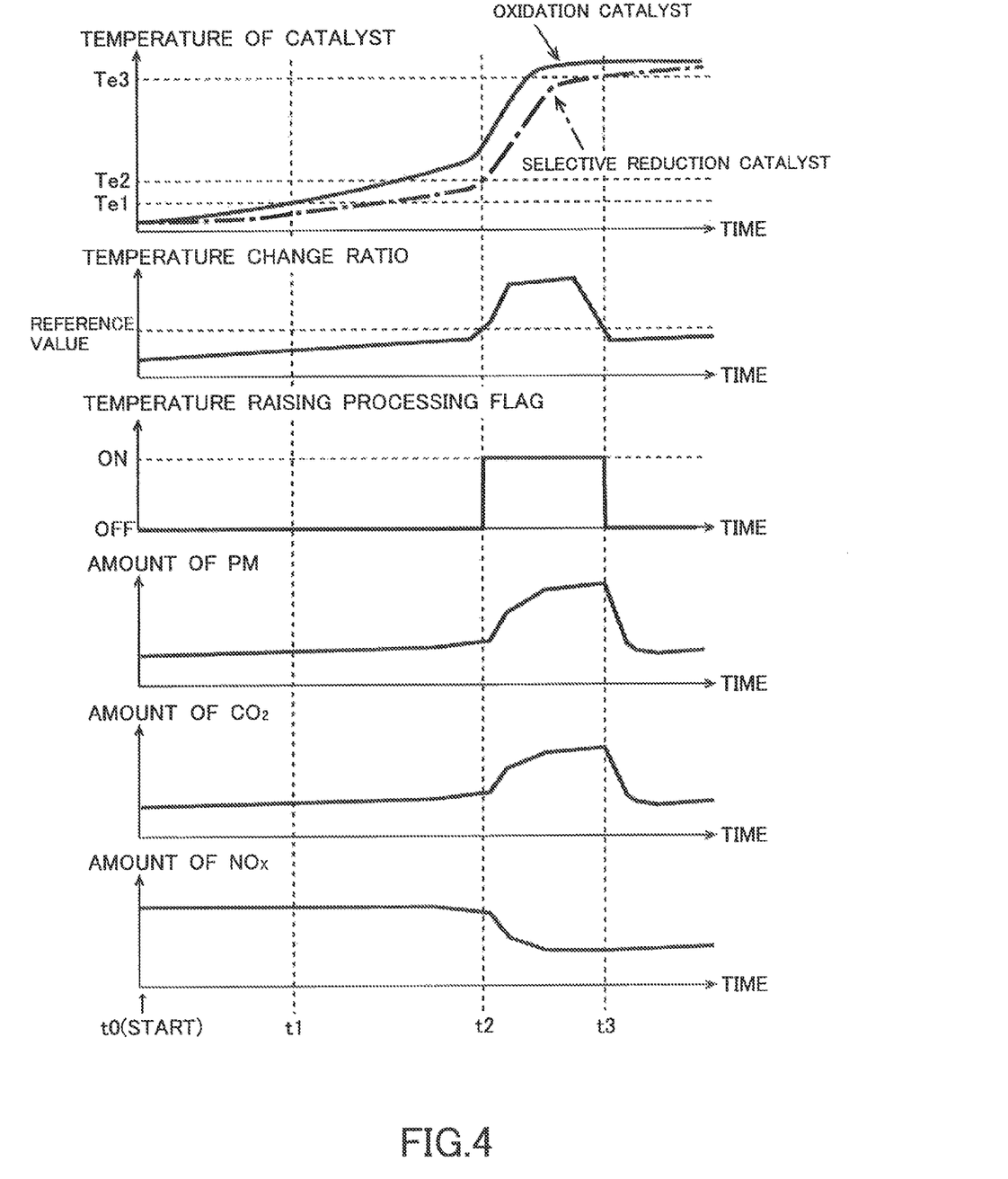
FIG. 4 is a timing chart showing an execution method for temperature raising processing.

Here, a method for executing the temperature raising processing in this embodiment will be described in line with a flow chart of FIG. 4. When the internal combustion engine 1 is started (at t0 in FIG. 4), the heat of the exhaust gas is conducted to the oxidation catalyst and the selective reduction catalyst. At that time, because the oxidation catalyst is arranged at the upstream side of the selective reduction catalyst, the temperature of the oxidation catalyst goes up earlier than the temperature of the selective reduction catalyst does. As a result, first, the temperature of the oxidation catalyst arrives at the first temperature Te1 (at t1 in FIG. 4) or above, and after that, the temperature of the selective reduction catalyst arrives at the second temperature Te2 (at t2 in FIG. 4) or above.

In a period of time (a first period of time) from the time when the internal combustion engine 1 is started until the temperature of the selective reduction catalyst arrives at the second temperature Te2 or above, the ratio of the amount of increase in the $NO_x$ removal rate with respect to the amount of rise in the temperature of the selective reduction catalyst (temperature change ratio) becomes small. For that reason, in the first period of time, the temperature raising processing is not executed (i.e., a temperature raising processing flag is off (OFF)).

In a period of time (a second period of time) from a point in time (at t2 in FIG. 4) at which the temperature of the selective reduction catalyst arrives at the second temperature Te2 or above until a point in time (at t3 in FIG. 4) at which the temperature of the selective reduction catalyst arrives at the third temperature Te3 or above, the temperature change ratio becomes large to a great extent, in comparison with that in the first period of time. For that reason, in the second period of time, the temperature raising processing is executed (i.e., the temperature raising processing flag is on (ON)). When the temperature raising processing is executed in the second period of time, the temperature of the selective reduction catalyst will go up quickly, and at the same time, the temperature change ratio also increases quickly. As a result, it is possible to increase the $NO_X$ removal rate in the selective reduction catalyst in a short time.

It is preferable that the amount of the unburnt fuel to be supplied to the oxidation catalyst per unit time at the time of the execution of the temperature raising processing be made larger than in the case where conventional temperature raising processing (i.e., processing in which the supply of the unburnt fuel to the oxidation catalyst is started at the time of, or immediately after, the start of the internal combustion engine 1) is executed. In that case, it is possible to make the rate of rise in the temperature of the selective reduction catalyst and the rate of increase in the $NO_X$ removal rate thereof large to a further extent. As a result, even in cases where a low load operating state of the internal combustion engine 1 is continued after the start thereof, the selective reduction catalyst can be activated quickly. In addition, the execution period of time of the temperature raising processing becomes short, thus making it possible to suppress an increase in the amount of fuel consumption (the amount of generation of $CO_2$) resulting from the temperature raising processing to a low level.

However, in the case where the temperature raising processing is not executed in the first period of time, an amount of NOx passing through the selective reduction catalyst (i.e., an amount of NOx which is not reduced and purified (removed) by the selective reduction catalyst, and hereinafter is referred to as a "passing-through amount of NOx") in the first period of time may become larger, in comparison with the case where the temperature raising processing is executed. In addition, when the amount of the unburnt fuel to be supplied to the oxidation catalyst per unit time in the temperature raising processing is made larger than that in conventional temperature raising processing, an amount of fuel consumption (an amount of generation of $CO_2$) in the second period of time may become larger than that in the conventional temperature raising processing.

On the other hand, the ECU 10 is configured such that it executes air amount reduction processing and smoke reduction processing in the first period of time.

The air amount reduction processing is processing for decreasing an amount of intake air to be sucked into the internal combustion engine 1, and is, for example, processing in which the degree of opening of the throttle valve 4 is made smaller, in comparison with the case where the temperature of the selective reduction catalyst is equal to or higher than the second temperature Te2, and where the other conditions than the temperature of the selective reduction catalyst are the same. Here, note that in cases where an exhaust throttle valve is arranged in the exhaust passage 3 of the internal combustion engine 1, the amount of intake air in the internal combustion engine 1 may be decreased by decreasing the degree of opening of the exhaust throttle valve. In addition, in cases where a turbine of a variable capacity type turbocharger is arranged in the exhaust passage 3 of the internal combustion engine 1, the amount of intake air in the internal combustion engine 1 may be decreased by changing the capacity of the turbine so as to make the supercharging pressure of the turbocharger low.

In the case where the degree of opening of the throttle valve 4 is made to be small, the flow rate of gas (exhaust gas) discharged from the internal combustion engine 1 decreases, in comparison with the case where the degree of opening of the throttle valve 4 is not made to be small. In the case where the flow rate of the exhaust gas is small, the absolute amount of NOx flowing into the second catalyst casing 6 per unit time becomes small, and at the same time, the space velocity (sv) of NOx in the second catalyst casing 6 also becomes small, in comparison with the case where the flow rate of the exhaust gas is large. As a result, the amount of NOx to be reduced and purified (removed) by means of the selective reduction catalyst becomes large, and at the same time, the $NO_X$ removal rate thereof also becomes high.

Accordingly, in cases where in the first period of time, the temperature raising processing is not executed and the air amount reduction processing is executed, the amount of fuel consumption (the amount of generation of $CO_2$) can be decreased, while suppressing the passing-through amount of NOx in the first period of time to be small, in comparison with the case where in the first period of time, the temperature raising processing is executed and the air amount reduction processing is not executed.

However, in the case where the air amount reduction processing is executed, the amount of generation of smoke including hydrocarbon (HC), etc., may increase, in comparison with the case where the air amount reduction processing is not executed. On the other hand, when the smoke reduction processing is executed in the first period of time, the increase of the smoke accompanying the execution of the air amount reduction processing can be suppressed.

The smoke reduction processing is processing for advancing the fuel injection timing of the fuel injection valves 1a, for example, the temperature of the selective reduction catalyst is more than the said the second temperature Te2, and is, for example, processing in which the fuel injection timing is caused to advance, in comparison with the case where the temperature of the selective reduction catalyst is equal to or higher than the second temperature Te2, and at the same time the other conditions than the temperature of the selective reduction catalyst are the same.

In the case where the fuel injection timing is advanced, a mixing period of time (a pre-mixed period of time) for mixing fuel and air with each other becomes longer, in comparison with the case where the fuel injection timing is not advanced. In the case where the pre-mixed period of time is long, it is easier for fuel and air to be homogeneously mixed with each other, in comparison with the case where the pre-mixed period of time is short. As a result, it becomes difficult for fuel to be combusted under the condition that oxygen is short or insufficient, so the amount of generation of smoke decreases.

Accordingly, in the case where in the first period of time, the temperature raising processing is not executed and at the same time the air amount reduction processing and the smoke reduction processing are executed, the amount of fuel consumption (the amount of generation of $CO_2$) and the amount of generation of smoke can be made small, while suppressing the passing-through amount of NOx in the first period of time to be small, in comparison with the case where in the first period of time, the temperature raising processing is executed, and at the same time, the air amount reduction processing and the smoke reduction processing are not executed.

Figure 5:
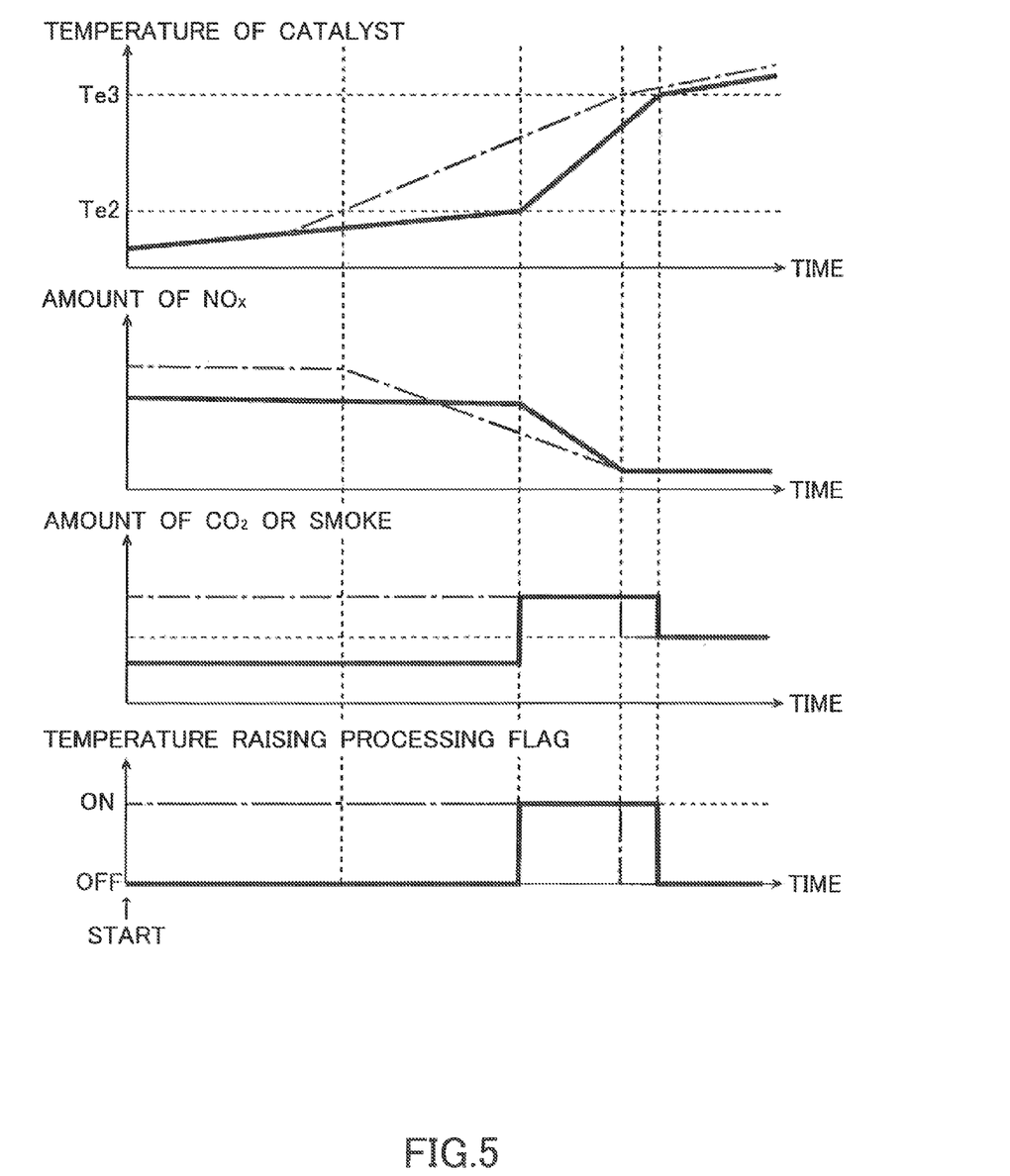
FIG. 5 is a timing chart showing an execution method for low gas amount (or volume) combustion processing.

Here, note that in cases where the temperature raising processing is not executed in the first period of time, the temperature raising processing will be started at the time when the temperature of the selective reduction catalyst reaches the second temperature Te2. For that reason, the passing-through amount of NOx, the amount of generation of smoke and the amount of fuel consumption (the amount of generation of $CO_2$) in the second period of time may become larger than in the case where the conventional temperature raising processing is executed, as shown in FIG. 5. Also, note that a solid line in FIG. 5 indicates the case where in the first period of time, the temperature raising processing is not executed, and at the same time, the air amount reduction processing and the smoke reduction processing are executed, and an alternate long and short dash line in FIG. 5 indicates the case where the conventional temperature raising processing is executed (i.e., the case where in the first period of time, the temperature raising processing is executed, and at the same time, the air amount reduction processing and the smoke reduction processing are not executed).

However, in the case where in the first period of time, the temperature raising processing is not executed and at the same time the smoke reduction processing and the air amount reduction processing are executed, the passing-through amount of NOx, the amount of generation of smoke and the amount of fuel consumption (the amount of generation of $CO_2$) in the first period of time become smaller, in comparison with the case where the conventional temperature raising processing is executed.

Accordingly, an amount of increase in the passing-through amount of NOx, an amount of increase in the amount of generation of smoke, and an amount of increase in the amount of fuel consumption (the amount of generation of $CO_2$) in the second period of time are offset by an amount of decrease in the passing-through amount of NOx, an amount of decrease in the amount of generation of smoke and an amount of decrease in the amount of fuel consumption (the amount of generation of $CO_2$) in the first period of time, respectively. In particular, in the case where in the first period of time, the temperature raising processing is not executed and at the same time the smoke reduction processing and the air amount reduction processing are executed, the amount of generation of smoke and the amount of fuel consumption (the amount of generation of $CO_2$) in the first period of time become smaller to a great extent, in comparison with the case where the conventional temperature raising processing is executed.

As a result, in the case where in the first period of time, the temperature raising processing is not executed and at the same time the air amount reduction processing and the smoke reduction processing are executed, it is possible to decrease the amount of generation of smoke and the amount of fuel consumption (the amount of generation of $CO_2$), while suppressing the amount of NOx passing through the selective reduction catalyst throughout the first period of time and the second period of time to be equal or less, in comparison with the case where in the first period of time, the temperature raising processing is executed and at the same time the air amount reduction processing and the smoke reduction processing are not executed.

As a result, according to the temperature raising processing of this embodiment, it becomes possible to activate the selective reduction catalyst in a short time, while suppressing the increase in the amount of fuel consumption (the amount of generation of $CO_2$) and the increase in the amount of generation of smoke to be small.

Figure 6:
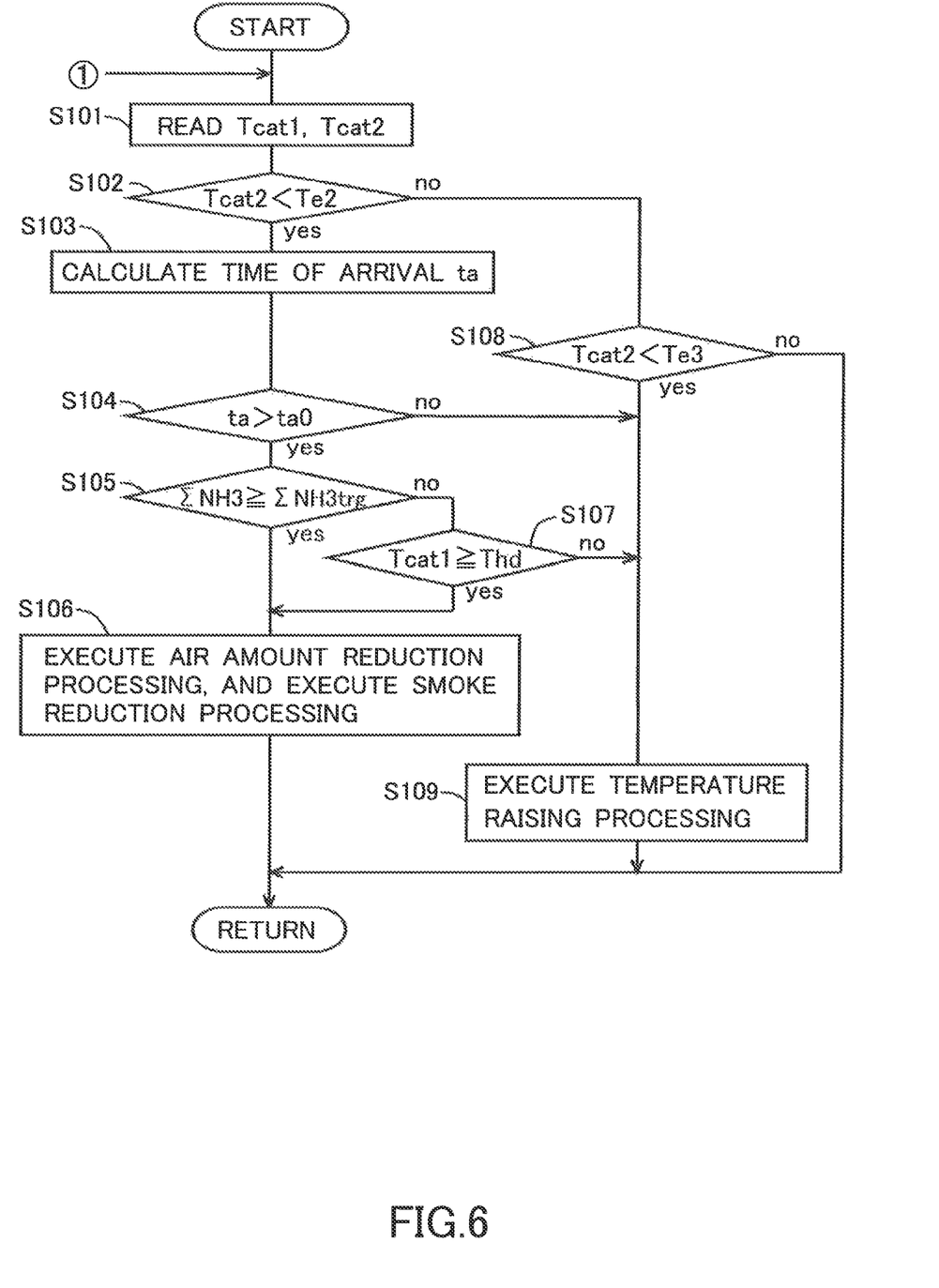
FIG. 6 is a flow chart showing a control routine executed by an ECU at the time when the low gas amount combustion processing is performed.

Next, an execution procedure of the temperature raising processing in this embodiment will be described in line with a flow chart of FIG. 6. FIG. 6 is a flow chart showing a control routine which is executed by the ECU 10 at the time when temperature raising control is performed. The control routine of FIG. 6 has been stored in the ROM, etc of the ECU 10 in advance, and is executed in a periodic manner by means of the ECU 10.

In the control routine of FIG. 6, first in step S101, the ECU 10 reads in an output signal Tcat1 of the first exhaust gas temperature sensor 8 and an output signal Tcat2 of the second exhaust gas temperature sensor 9.

In step S102, the ECU 10 determines whether the temperature of the selective reduction catalyst is less than the second temperature Tet. At that time, the ECU 10 uses the output signal Tcat2 of the second exhaust gas temperature sensor 9 as a value which is correlated with the temperature of the selective reduction catalyst. In cases where an affirmative determination is made in step S102 (Tcat2<Te2), the control routine of the ECU 10 goes to the processing of step S103.

In step S103, the ECU 10 calculates a period of time (a time of arrival) ta taken for the temperature of the selective reduction catalyst to arrive at the second temperature Te2. The time of arrival ta referred to herein is a period of time which is taken for the temperature of the selective reduction catalyst to arrive at the second temperature Te2, when the temperature raising processing is not executed.

The time of arrival ta changes according to the temperature and the flow rate of the exhaust gas discharged from the internal combustion engine 1. The temperature of the exhaust gas is correlated with the required torque or the required acceleration of the internal combustion engine 1. The flow rate of the exhaust gas is correlated with the number of revolutions per unit time of the internal combustion engine 1 (i.e., the number of engine revolutions per unit time). Accordingly, the time of arrival ta can be calculated by using, as parameters, the required torque or the required acceleration of the internal combustion engine 1, and the number of engine revolutions per unit time.

Here, note that the required torque or the required acceleration of the internal combustion engine 1 is correlated with the output signal of the accelerator position sensor 12 (i.e., the accelerator opening degree), or the rate of change of the accelerator opening degree. For that reason, the time of arrival ta may be calculated by using, as parameters, the accelerator opening degree or the rate of change of the accelerator opening degree, and the number of engine revolutions per unit time. In addition, the relation among the accelerator opening degree or the rate of change of the accelerator opening degree, the number of engine revolutions per unit time, and the time of arrival ta may have been made into a map in advance, and the time of arrival ta may be calculated from this map.

In step s104, the ECU 10 determines whether the time of arrival ta calculated in the above-mentioned step S103 is longer than a reference period of time ta0. The reference period of time ta0 referred to herein is the longest period of time in which in the case where it is assumed that the temperature raising processing is started at the present point in time, the amount of NOx passing through the selective reduction catalyst, the amount of generation of smoke, and the amount of fuel consumption (the amount of generation of $CO_2$) through the first period of time and the second period of time can be considered to become less than in the case where the conventional temperature raising processing is executed. Also, the reference period of time ta0 is a period of time which is obtained in advance by means of adaptation processing using experiments, etc.

Here, note that the reference period of time ta0 may be a period of time which is taken for the effect of the temperature raising processing to reflect on the change in temperature of the selective reduction catalyst in the case of assuming that the temperature raising processing is started at the present point in time, in other words, a period of time taken from the start of the temperature raising processing for the heat of oxidation reaction generated in the oxidation catalyst to transmit to the selective reduction catalyst.

In cases where an affirmative determination is made in the above-mentioned step S104 (ta>ta0), the control routine of the ECU 10 goes to the processing of step S105. In step S105, the ECU 10 determines whether an amount of $NH_3$ adsorption $\Sigma NH_3$ of the selective reduction catalyst is equal to or more than a target amount of adsorption $\Sigma NH_3 trg$. The "target amount of adsorption $\Sigma NH_3 trg$" referred to herein is an amount of $NH_3$ adsorption $\Sigma NH_3$ necessary in order to suppress the passing-through amount of NOx in the first period of time to an amount equal to or less than an upper limit value which has been estimated in advance, in the case of assuming that the temperature raising processing is not executed and at the same time the air amount reduction processing and the smoke reduction processing are executed. Also, the target amount of adsorption is a value which is decided in advance by means of adaptation processing using experiments, etc. In addition, the amount of $NH_3$ adsorption $\Sigma NH_3$ of the selective reduction catalyst can be obtained by means of a known calculation method using, as a parameter(s), the history of the addition of the aqueous urea solution by the reducing agent addition valve 7, the history of the amount of NOx having been discharged from the internal combustion engine 1, and so on.

In cases where an affirmative determination is made in the above-mentioned step S105 ($\Sigma NH_3 \geq \Sigma NH_3 trg$), the control routine of the ECU 10 goes to the processing of step S106. In step S106, the ECU 10 executes the air amount reduction processing and the smoke reduction processing. Specifically, the ECU 10 makes small the degree of opening of the throttle valve 4 (i.e., the throttle opening degree), and advances the fuel injection timing. At that time, it is desirable to set an amount of decrease of the throttle opening degree and an amount of advance of the fuel injection timing to maximum values, respectively, in which the fluctuation of torque and the misfire of the internal combustion engine 1 do not occur, and it is also desirable to obtain these values in advance by means of adaptation processing using experiments, etc.

In cases where a negative determination is made in the above-mentioned step S105 ($\Sigma NH_3 < \Sigma NH_3 trg$), the control routine of the ECU 10 goes to the processing of step S107. In step S107, the ECU 10 determines whether the temperature of the exhaust gas flowing into the selective reduction catalyst is equal to or higher than a predetermined temperature Thd. The "predetermined temperature Thd" referred to herein is a temperature which is obtained by adding a margin to the lowest temperature at which the aqueous urea solution is hydrolyzed. Here, note that as the temperature of the exhaust gas flowing into the selective reduction catalyst, there can be used the output signal Tcat1 of the first exhaust gas temperature sensor 8.

Here, in cases where the temperature Tcat1 of the exhaust gas flowing into the selective reduction catalyst is lower than the predetermined temperature Thd, even if the addition of the aqueous urea solution from the reducing agent addition valve 7 is executed, the amount of $NH_3$ adsorption $\Sigma NH_3$ of the selective reduction catalyst can not be made to increase. In addition, when the air amount reduction processing and the smoke reduction processing are executed without executing the temperature raising processing at the time the amount of $NH_3$ adsorption $\Sigma NH_3$ of the selective reduction catalyst is less than the target amount of adsorption $\Sigma NH_3 trg$, the passing-through amount of NOx in the first period of time and the second period of time may become larger than in the case where the conventional temperature raising processing is executed.

Accordingly, it is desirable that in cases where the temperature Tcat1 of the exhaust gas flowing into the selective reduction catalyst is lower than the predetermined temperature Thd, the temperature raising processing be executed, with the air amount reduction processing and the smoke reduction processing being not executed. Accordingly, in cases where an affirmative determination is made in the above-mentioned step S107 (Tcat1≥Thd), the control routine of the ECU 10 goes to the processing of step S106, whereas in cases where a negative determination is made in the above-mentioned step S107 (Tcat1<Thd), the control routine of the ECU 10 goes to the processing of step S109. In step S109, the ECU 10 executes the temperature raising processing. When the temperature raising processing is executed in cases where a negative determination is made in step S107, the passing-through amount of NOx, the amount of generation of smoke and the amount of fuel consumption (the amount of generation of $CO_2$) in the first period of time and the second period of time become substantially equivalent to the case where the conventional temperature raising processing is executed. Accordingly, it is possible to cause the temperature of the selective reduction catalyst to go up, while suppressing the passing-through amount of NOx, the amount of generation of smoke and the amount of fuel consumption (the amount of generation of $CO_2$) to the same levels as in the case of the conventional temperature raising processing.

Here, note that in cases where a negative determination is made in the above-mentioned step S104 (ta≤ta0), the control routine of the ECU 10 goes to the processing of step S109. In that case, it is possible to bring forward the starting point in time of the temperature raising processing, while suppressing the passing-through amount of NOx, the amount of generation of smoke and the amount of fuel consumption (the amount of generation of $CO_2$) in the first period of time and the second period of time to values less than in the case where the conventional temperature raising processing is executed. In other words, it is possible to bring forward the time at which the selective reduction catalyst becomes activated, while suppressing the passing-through amount of NOx, the amount of generation of smoke and the amount of fuel consumption (the amount of generation of $CO_2$) to values less than in the case where the conventional temperature raising processing is executed.

In addition, in cases where a negative determination is made in the above-mentioned step S102 (Tcat2>Te2), the control routine of the ECU 10 goes to the processing of step S108. In step S108, the ECU 10 determines whether the temperature Tcat2 of the selective reduction catalyst is less than the third temperature Te3. In cases where a negative determination is made in step S108 (Tcat2≥Te3), the selective reduction catalyst is in a completely active state, and hence, the ECU 10 ends the execution of this routine. On the other hand, in cases where an affirmative determination is made in step S108 (Tcat2<Te3), the selective reduction catalyst is not in the completely active state, and hence, the control routine of the ECU 10 goes to step S109, where the temperature raising processing is executed.

As described above, a control unit according to the present invention is achieved by means of the ECU 10 executing the control routine of FIG. 6. As a result, it becomes possible to execute the temperature raising processing of the selective reduction catalyst, while suppressing the passing-through amount of NOx, the amount of generation of smoke and the amount of fuel consumption (the amount of generation of $CO_2$) in a period of time from the start of the internal combustion engine 1 until the selective reduction catalyst becomes activated, to be equal to or less than in the case where the conventional temperature raising processing is executed.

Figure 7:
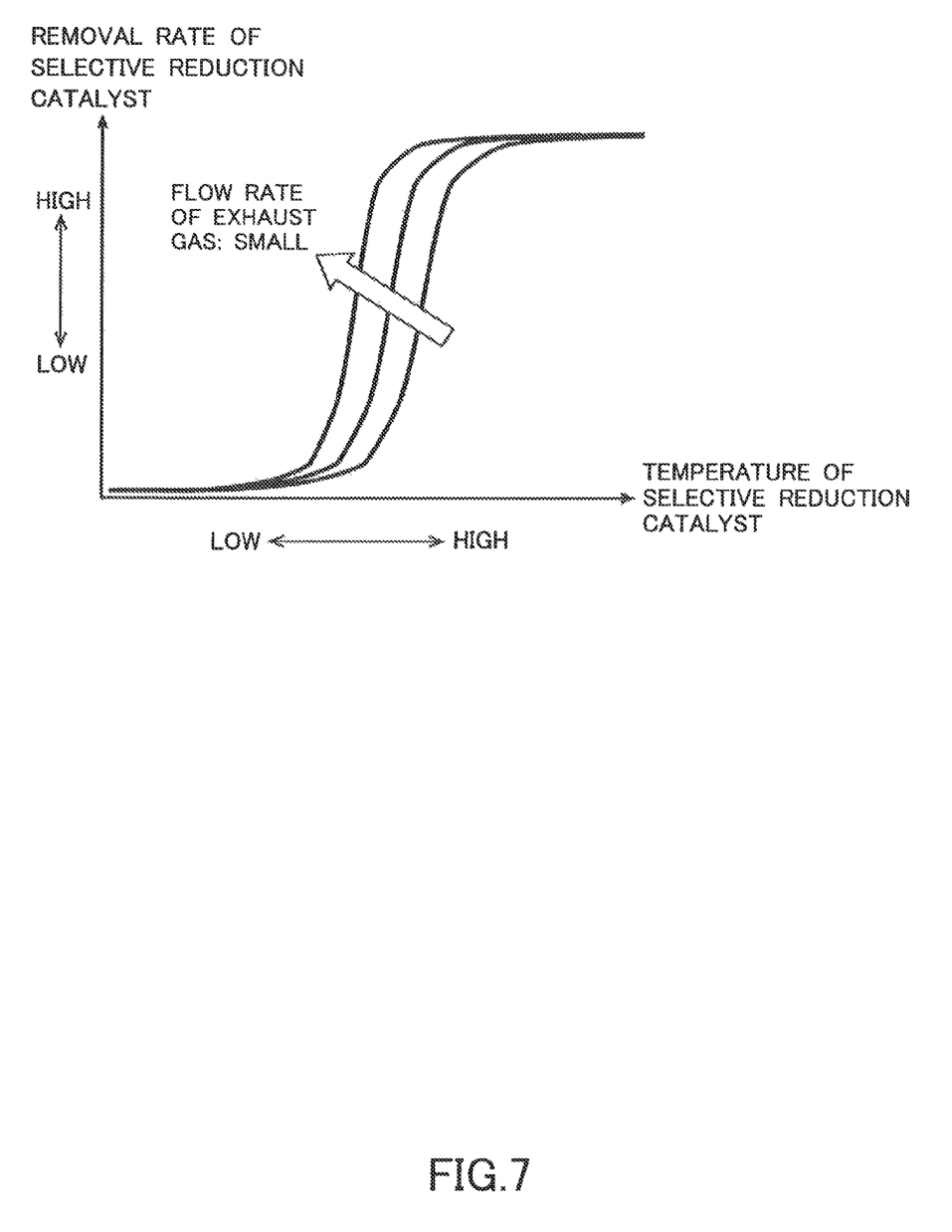
FIG. 7 is a view showing the relation among the temperature of the selective reduction catalyst, the NOx removal rate thereof, and the flow rate of exhaust gas.

Here, note that the smaller the flow rate of the exhaust gas passing through the second catalyst casing 6, the lower the temperature of the selective reduction catalyst tends to become, at which the above-mentioned temperature change ratio becomes equal to or more than the above-mentioned reference value, as shown in FIG. 7. Accordingly, the ECU 10 may calculate the $NO_X$ removal rate in the selective reduction catalyst during the period of the execution of the air amount reduction processing and the smoke reduction processing, so that when the $NO_X$ removal rate exceeds a fixed value, the temperature raising processing may be caused to be started. At that time, an NOx sensor may be arranged in the exhaust passage 3 at the upstream side of the second catalyst casing 6, and another NOx sensor may be arranged in the exhaust passage 3 at the downstream side of the second catalyst casing 6, so that the $NO_X$ removal rate may be calculated by using the output signals of these NOx sensors as parameters. According to such a method, it is possible to bring forward the time at which the selective reduction catalyst becomes activated, to a further extent.

Figure 8:
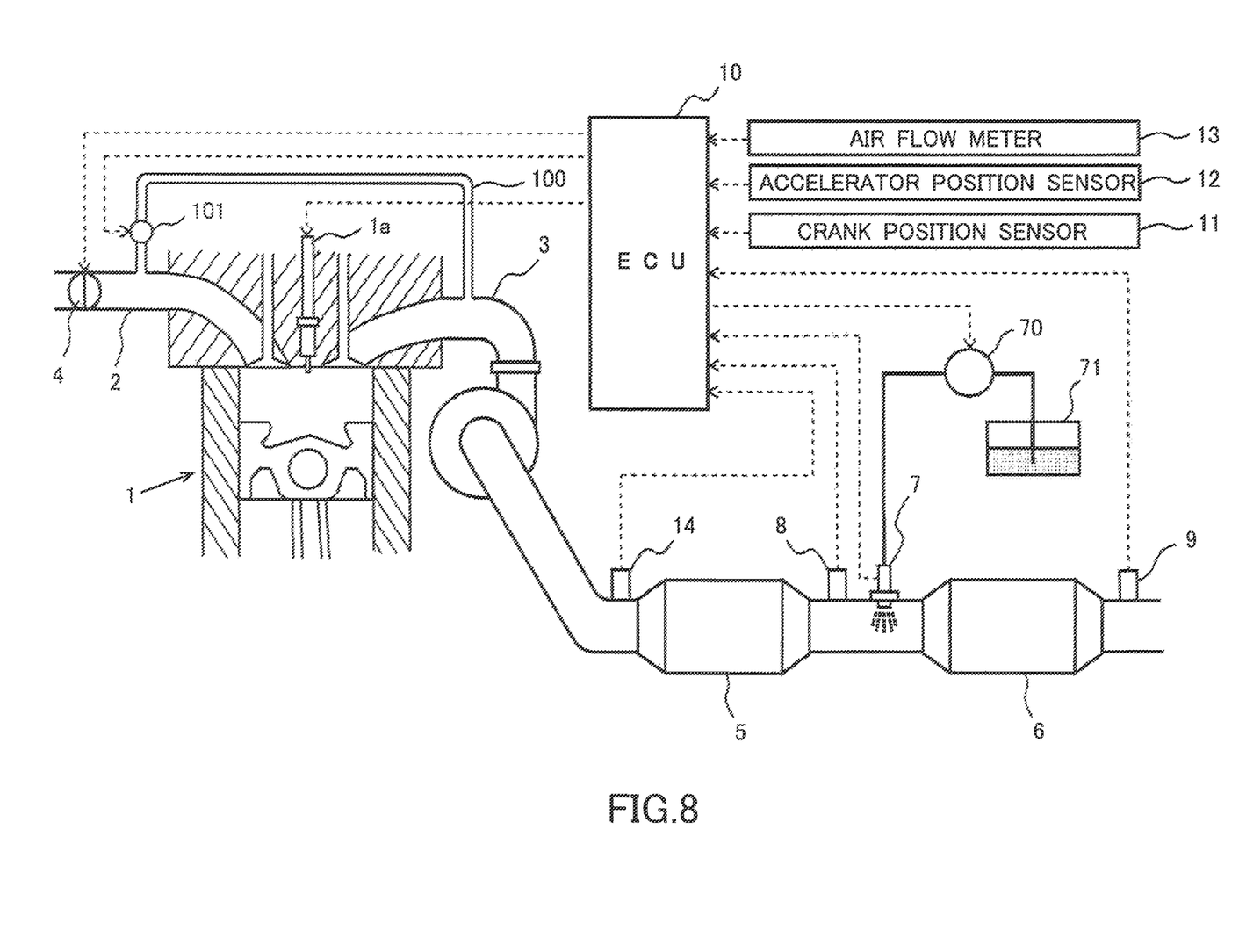
FIG. 8 is a view showing another construction example of an internal combustion engine to which the present invention is applied.

Moreover, as shown in FIG. 8, in cases where an exhaust gas recirculation (EGR) device, which is equipped with an EGR passage 100 through which the intake passage 2 and the exhaust passage 3 are placed in communication with each other, and an EGR valve 101 which changes the channel cross section of the EGR passage 100, is mounted on the internal combustion engine 1, the ECU 10 may execute, as the smoke reduction processing, the processing to decrease the amount of EGR gas (i.e., processing to make small the degree of opening of the EGR valve 101). In addition, the ECU 10 may execute, as the smoke reduction processing, both of the processing to make small the degree of opening of the EGR valve 101 and the processing to advance the fuel injection timing. In this case, it is possible to suppress the amount of generation of smoke to a further extent. Here, note that in the case where the amount of EGR gas is decreased, the amount of NOx discharged from the internal combustion engine 1 may become larger, in comparison with the case where the amount of EGR gas is not decreased. However, because the air amount reduction processing is executed at the same time with the smoke reduction processing, the amount of NOx discharged from the internal combustion engine 1 is not increased to an excessive extent.

DESCRIPTION OF THE REFERENCE SIGNS

1 internal combustion engine
1a fuel injection valves
2 intake passage
3 exhaust passage
4 throttle valve
5 first catalyst casing
6 second catalyst casing
7 reducing agent addition valve
8 first exhaust gas temperature sensor
9 second exhaust gas temperature sensor
10 ECU
11 crank position sensor
12 accelerator position sensor
13 air flow meter
14 A/F sensor
70 pump
71 reducing agent tank
100 EGR passage
101 EGR valve

The invention claimed is:

1. An exhaust gas purification apparatus for an internal combustion engine comprising:
   an NOx catalyst that is arranged in an exhaust passage of the internal combustion engine;
   a sensor that detects the temperature of said NOx catalyst;
   a first valve operable to adjust an amount of smoke discharged from the internal combustion engine;
   an air valve operable to adjust an amount of intake air to be sucked into the internal combustion engine;
   a fuel valve configured to supply fuel directly into the exhaust passage upstream of said NOx catalyst; and
   an electronic control unit operatively connected to the sensor, the first valve, the air valve, and the fuel valve and configured to:
     execute smoke reduction processing via the first valve which is processing to cause the internal combustion engine to operate in such a manner that an amount of smoke discharged from the internal combustion engine becomes small;
     execute air amount reduction processing via the air valve which is processing to cause the internal combustion engine to operate in such a manner that an amount of intake air to be sucked into the internal combustion engine becomes small; and
     execute temperature raising processing via the fuel valve which is processing to raise the temperature of said NOx catalyst;
     wherein said smoke reduction processing and said air amount reduction processing are executed, without executing said temperature raising processing, when the temperature detected by said sensor is less than a lower limit value which is lower than an activation temperature of said NOx catalyst, and said temperature raising processing is executed when the temperature detected by said sensor is equal to or more than said lower limit value and at the same time is less than said activation temperature.

2. The exhaust gas purification apparatus for an internal combustion engine in claim 1, wherein said smoke reduction processing includes processing to advance fuel injection timing, which is the time when fuel is injected into a cylinder of the internal combustion engine.

3. The exhaust gas purification apparatus for an internal combustion engine in claim 1, further comprising:
   an EGR valve that serves to introduce, as an EGR gas, a part of the exhaust gas into a cylinder of the internal combustion engine;
   wherein said smoke reduction processing includes processing to decrease an amount of the EGR gas introduced into the cylinder by said EGR valve.

4. The exhaust gas purification apparatus for an internal combustion engine in claim 2, further comprising:
   an EGR valve that serves to Introduce, as an EGR gas, a part of the exhaust gas into a cylinder of the internal combustion engine;
   wherein said smoke reduction processing includes processing to decrease an amount of the EGR gas introduced into the cylinder by said EGR valve.

* * * * *